(12) United States Patent
Rangachari et al.

(10) Patent No.: US 10,986,041 B2
(45) Date of Patent: Apr. 20, 2021

(54) METHOD AND APPARATUS FOR VIRTUAL NETWORK FUNCTIONS AND PACKET FORWARDING

(71) Applicant: Futurewei Technologies, Inc., Plano, TX (US)

(72) Inventors: Muralidharan Rangachari, San Ramon, CA (US); Huida Dai, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 180 days.

(21) Appl. No.: 16/057,087

(22) Filed: Aug. 7, 2018

(65) Prior Publication Data

US 2020/0053026 A1    Feb. 13, 2020

(51) Int. Cl.
*H04L 12/935*   (2013.01)
*H04L 12/713*   (2013.01)
*H04L 12/721*   (2013.01)

(52) U.S. Cl.
CPC .......... *H04L 49/3063* (2013.01); *H04L 45/44* (2013.01); *H04L 45/566* (2013.01); *H04L 45/586* (2013.01)

(58) Field of Classification Search
None
See application file for complete search history.

(56) References Cited

U.S. PATENT DOCUMENTS

| | | |
|---|---|---|
| 2005/0125485 A1 | 6/2005 | Tripathi et al. |
| 2008/0002578 A1 | 1/2008 | Coffman et al. |
| 2013/0121137 A1 | 5/2013 | Feng et al. |
| 2013/0144978 A1 | 6/2013 | Jain et al. |
| 2015/0055620 A1* | 2/2015 | Vesterinen ............ H04L 5/0035 370/331 |
| 2015/0055621 A1* | 2/2015 | Koskinen ............... H04W 36/18 370/331 |
| 2016/0050122 A1* | 2/2016 | Cortes Gomez ........ H04L 41/28 713/168 |
| 2017/0124021 A1 | 5/2017 | Brown et al. |
| 2017/0164265 A1* | 6/2017 | Dai ................... H04W 36/0011 |

(Continued)

FOREIGN PATENT DOCUMENTS

| | | |
|---|---|---|
| CN | 105227645 A | 1/2016 |
| CN | 106230917 A | 12/2016 |

(Continued)

OTHER PUBLICATIONS

"International Application No. PCT/CN2019/098293, International Search Report and Written Opinion dated Sep. 26, 2019", (Sep. 26, 2019), 9 pgs.

(Continued)

*Primary Examiner* — Kodzovi Acolatse
(74) *Attorney, Agent, or Firm* — Schwegman Lundberg & Woessner, P.A.

(57) ABSTRACT

Processing of data packets is controlled in a system using identifiers assigned locally in the system for each data packet, where each data packet is received at an entry point in the system. Each data packet can be processed along a directed graph data structure based on the identifiers, where the directed graph data structure provides a network pipeline to forward the data packets. Additional apparatus, systems, and methods are disclosed.

20 Claims, 5 Drawing Sheets

(56) References Cited

U.S. PATENT DOCUMENTS

| | | | | |
|---|---|---|---|---|
| 2017/0237607 | A1* | 8/2017 | Smith | H04L 67/141 |
| | | | | 709/223 |
| 2018/0054756 | A1* | 2/2018 | Kahtava | H04L 47/122 |
| 2018/0295053 | A1 | 10/2018 | Leung et al. | |
| 2018/0349396 | A1 | 12/2018 | Blagojevic et al. | |
| 2018/0367322 | A1* | 12/2018 | Watanabe | H04L 12/1403 |
| 2019/0281495 | A1 | 9/2019 | Wu et al. | |
| 2019/0373521 | A1* | 12/2019 | Crawford | H04L 67/10 |
| 2020/0015293 | A1* | 1/2020 | Wang | H04W 76/11 |
| 2020/0050576 | A1 | 2/2020 | Rangachari et al. | |

FOREIGN PATENT DOCUMENTS

| | | |
|---|---|---|
| CN | 107182091 A | 9/2017 |
| WO | WO-2014070738 A1 | 5/2014 |
| WO | WO-2015171414 A1 | 11/2015 |
| WO | WO-2016048144 A1 | 3/2016 |
| WO | WO-2018099046 A1 | 6/2018 |

OTHER PUBLICATIONS

"Atomic Operations", Intel Developer Zone. [online]. [retrieved on Feb. 26, 2018]. Retrieved from the Internet: <URL: https://software.intel.com/en-us/node/506090>, (2018), 3 pgs.

"Data Plane Development Kit (DPDK)", [online]. [retrieved on Mar. 26, 2018]. Retrieved from the Internet: <URL: https://dpdk.org/>, (2018), 2 pgs.

"VPP—Vector Packet Processing", [online]. [retrieved on Mar. 26, 2018]. Retrieved from the Internet: <URL: https://wiki.fd.io/view/VPP>, (2018), 6 pgs.

Chu, J., et al., "Transmission of IP over InfiniBand (IPoIB)", RFC 4391, Network Working Group, (Apr. 2006), 21 pgs.

Fettweis, Gerhard, et al., "The Tactile Internet", ITU-T Technology Watch Report, (Aug. 2014), 24 pgs.

Ghodsi, Ali, et al., "Multi-Resource Fair Queueing for Packet Processing", Proceedings of the ACM SIGCOMM 2012 Conference on Applications, Technologies, Architectures, and Protocols for Computer Communication, (2012), 12 pgs.

Han, Sangjin, et al., "SoftNIC: A Software NIC to Augment Hardware", Technical Report No. UCB/EECS-2015-155, Electrical Engineering and Computer Sciences, University of California at Berkeley, (May 27, 2015), 1-15.

Kohler, Eddie, et al., "The Click Modular Router", ACM Transactions on Computer Systems, 18(3), (Aug. 2000), 263-297.

"International Application No. PCT/CN2019/098292, International Search Report and Written Opinion dated Oct. 23, 2019", (Oct. 23, 2019), 9 pgs.

U.S. Appl. No. 16/057,006, filed Aug. 7, 2018, Multi-Node Zero-Copy Mechanism for Packet Data Processing.

"U.S. Appl. No. 16/057,006, Advisory Action dated Aug. 17, 2020", 5 pgs.

"U.S. Appl. No. 16/057,006, Response filed Aug. 6, 2020 to Final Office Action dated Jun. 8, 2020", 12 pgs.

"U.S. Appl. No. 16/057,006, Final Office Action dated Jun. 8, 2020", 16 pgs.

"U.S. Appl. No. 16/057,006, Non Final Office Action dated Feb. 21, 2020", 15 pgs.

"U.S. Appl. No. 16/057,006, Response filed May 20, 2020 to Non Final Office Action dated Feb. 21, 2020", 12 pgs.

\* cited by examiner

METHOD AND APPARATUS FOR VIRTUAL NETWORK FUNCTIONS AND PACKET FORWARDING

RELATED APPLICATIONS

This application is related to U.S. application Ser. No. 16/057,006, entitled "MULTI-NODE ZERO-COPY MECHANISM FOR PACKET DATA PROCESSING" filed Aug. 7, 2018, which patent application is incorporated herein by reference in its entirety.

FIELD OF THE INVENTION

The present disclosure is related to data communication and, in particular, data packet processing and forwarding in a network.

BACKGROUND

Many processing-based applications are becoming cloud-based. Typically, the term "cloud" refers to data processing on a number of virtual servers as opposed to directly on physical machines. A cloud could span across a wide area network (WAN). WAN is also commonly referred to the public Internet or sometimes also a network of leased optic fiber links that inter-connect multiple branch offices of an Enterprise. Or alternately, a cloud could be entirely resident within a private datacenter within an internal local area network. Datacenters of clouds, meaning datacenters that host virtual compute or services, can also provide services for network traffic management from one location on a network to another location on the network or across networks spanning far flung locations over WAN (or Internet). In addition, the term "cloud computing" refers to the software and services executed for users by these servers virtually (over a hypervisor), and typically the user is unaware of the physical location of the servers or datacenter. Further, the datacenter may be a distributed entity. Cloud computing can provide shared computer processing resources and data to computers and other devices on demand over the associated networks.

Associated with a network of a cloud are devices and software to perform functions for the network. Examples of such functions are switching, routing, establishing secured tunnels (VPN) etc. Such functions can be facilitated by virtual processes. A virtualized network function, or VNF, is responsible for handling specific network functions that would run in one or more virtual machines (a virtual machine being a self-contained operating environment that behaves as if it is a separate computer) on top of a hardware networking infrastructure. The hardware networking infrastructure can include routers, switches, servers, cloud computing systems, and more. VNFs can move individual network functions out of dedicated hardware devices into software that can run on commodity hardware. Many VNF deployments can be realized as cloud-based deployments.

Edge cloud is a new computing paradigm for distributed computing, which is being deployed to address issues with typical cloud computing that is performed by a centralized cloud. Such centralized clouds are constrained to address network latencies, which are critical in modern real-time applications. In addition, Internet bandwidth, associated with centralized cloud computing, is physically limited. A key concept for implementing edge cloud networking is to distribute processing across multiple small clouds to enable ultra-low latency response times, high throughput, and a highly flexible cloud platform. Because it is not in a centralized data center, the physical footprint requirements and type of hardware used in an edge cloud platform are different from traditional cloud platforms.

IoT is a network of physical devices, vehicles, home appliances and other items embedded with electronics, software, sensors, and actuators, which are enabled to connect and exchange data allowing for direct integration of devices in the physical world into computer-based systems. One of the requirements for IoT communications in 5G LTE is a roundtrip latency between 1 and 4 milliseconds, depending on the application. In any communication through a mobile provider, data packets are not simply forwarded, but often are processed through a set of virtual network functions (VNFs) executed by the provider. However, execution of each VNF uses CPU cycles, and hence adds to the accumulated round-trip (RTT) latency. In addition to transporting data packets from a user equipment (UE), for real-time applications it is a challenge to accomplish such transport with 1 to 4 millisecond RTT latency as required by 5G. Today, the typical RTT is about 20 milliseconds.

Various approaches are being considered that are directed to attaining an RTT latency of under 4 milliseconds, including services, that is, including VNFs that run in the infrastructure of such approaches. Clouds are evolving into distributed Mesh structures in one approach. Deployment of edge networks may reduce such latency associated with reducing distance. In many approaches, micro-services, which allow in-place upgrades and modularity that is reusable and extensible, are preferred. A micro-service architecture will structure an application as a collection of loosely-coupled services, each of which implements a unique capability, and is called a micro-service. A bunch of micro-services can be put together to form an application or a software service. Operationally, a micro-service architecture can enable continuous delivery and deployment of large, complex applications and can enable an organization to evolve its technology stack by replacing individual micro-services or adding new ones.

VNFs in a data plane, which will need ultra low latency, may span physical nodes at a processing location, where the physical nodes can include hardware that is heterogeneous. VNF micro-services can pay a latency penalty, if spread across nodes within a cluster at a location, such as at an edge cloud.

SUMMARY

Systems and methods can be implemented to control forwarding of data packets in systems such as edge clouds, equipment coupled to larger clouds, or other such equipment. Processing a set of data packets is controlled using identifiers assigned locally in the system for each data packet received at an entry point in the system. The identifiers may be used for the forwarding of the data packets. A modular framework can be used to generate software modules for realizing network functions or packet forwarding. To compose a service, software modules can be connected to generate a directed graph data structure. The directed graph data structure provides network pipelines to forward data packets in the system.

Each data packet can be processed along a directed graph data structure based on the identifiers assigned locally. Representation of each received data packet can be converted into a representation internal to the system, including a port identifier or a policy identifier assigned to each data packet for forwarding in the data plane. The port identifier and the policy identifier can be saved in a metadata area of the respective data packet. Each data packet can be processed by none, one, or more than one virtual network function that can be dynamically configurable in the modular framework. A local device identifier for each virtual network function can be assigned. A local datapath identifier can be assigned for a unique path for the respective data packet to traverse through the network pipeline provided by the directed graph data structure. A Datapath typically represents a Network or a Subnet in a traditional networking paradigm. The device identifier and the datapath identifier are used in a control plane of the system. The use of internal identifiers and directed graphs in conjunction with reusable modules to create services, such as virtual network functions, can provide for high performance and low latency in the processing and transmission of data packets.

According to one aspect of the present disclosure, there is provided a system comprising a memory storage comprising instructions; and one or more processors in communication with the memory storage, wherein the one or more processors execute the instructions to: control processing of a set of data packets using identifiers assigned locally in the system for each data packet received at an entry point in the system; and process each data packet along a directed graph data structure based on the identifiers assigned locally, the directed graph data structure providing a network pipeline to forward the data packet.

Optionally, in any of the preceding aspects, another implementation of the aspect provides that the identifiers assigned locally for a data packet include a port identifier corresponding to a packet destination or a policy identifier associated with a service level agreement policy, with the service level agreement policy defining a factor for selecting a path taken by the data packet through the network pipeline.

Optionally, in any of the preceding aspects, a further implementation of the aspect provides that the one or more processors execute the instructions to process the data packet at one or more virtual network functions of the system based on the identifiers assigned locally, each virtual network function being deployed as a set of nodes in the directed graph data structure.

Optionally, in any of the preceding aspects, a further implementation of the aspect provides that the identifiers assigned locally include a device identifier for each virtual network function and a datapath identifier corresponding to a network mapping to which the respective data packet belongs, the device identifier and the datapath identifier managed in control logic of the system and used to direct the respective data packet to the packet destination or through a service-chain defined by a chain of virtual network functions.

Optionally, in any of the preceding aspects, a further implementation of the aspect provides that the one or more processors execute the instructions to create the one or more virtual network functions, to configure the one or more virtual network functions dynamically at runtime, and to connect the created one or more virtual network functions into a data pipeline.

Optionally, in any of the preceding aspects, a further implementation of the aspect provides that the one or more virtual network functions include one or more sub-functions.

Optionally, in any of the preceding aspects, a further implementation of the aspect provides that the one or more processors execute the instructions to perform operations as a classifier to: receive the set of data packets; classify data packets of the set of data packets; augment each data packet into an internal representation including a port identifier or a policy identifier; and save the port identifier or the policy identifier within a metadata area of the respective data packet.

Optionally, in any of the preceding aspects, a further implementation of the aspect provides that results of processing operations along the network pipeline are saved in the metadata area of the respective data packet.

Optionally, in any of the preceding aspects, a further implementation of the aspect provides that the identifiers assigned locally for a data packet include a multi-cast identifier.

According to one aspect of the present disclosure, there is provided a computer-implemented method for local processing of data packets, comprising: controlling, with one or more processors, processing of a set of data packets using identifiers assigned locally in the system for each data packet received at an entry point in the system; and processing, with the one or more processors, each data packet along a directed graph data structure based on the identifiers assigned locally, with the directed graph data structure providing a network pipeline to forward the data packet.

Optionally, in any of the preceding aspects, another implementation of the aspect provides that the identifiers assigned locally for a data packet include a port identifier corresponding to a packet destination or a policy identifier associated with a policy, the policy defining a factor for selecting a path taken by the data packet through the network pipeline.

Optionally, in any of the preceding aspects, a further implementation of the aspect provides processing each data packet to include processing the data packet at one or more virtual network functions of the system based on the identifiers assigned locally, each virtual network function being deployed as a set of nodes in the directed graph data structure.

Optionally, in any of the preceding aspects, a further implementation of the aspect provides that the identifiers assigned locally include a device identifier for each virtual network function and a datapath identifier reflecting the network of the respective data packet, the device identifier and the datapath identifier managed in control logic of the system and used to direct the respective data packet to the packet destination or through a service-chain defined by a chain of virtual network functions.

Optionally, in any of the preceding aspects, a further implementation of the aspect provides that the computer-implemented method includes creating the one or more virtual network functions, configuring the one or more virtual network functions dynamically at runtime, and connecting the created one or more virtual network functions into a data pipeline.

Optionally, in any of the preceding aspects, a further implementation of the aspect provides the one or more virtual network functions include one or more sub-functions.

Optionally, in any of the preceding aspects, a further implementation of the aspect provides that the computer-implemented method includes performing operations as a classifier, the operations including: receiving the set of data packets; classifying data packets of the set of data packets; augmenting each data packet into an internal representation including a port identifier and a policy identifier; and saving the port identifier and the policy identifier in a metadata area of the respective data packet.

Optionally, in any of the preceding aspects, a further implementation of the aspect provides that the computer-implemented method includes saving, in the metadata area of each data packet, results of processing each data packet as it traverses through the directed graph data structure.

Optionally, in any of the preceding aspects, a further implementation of the aspect that the computer-implemented method includes assigning a multi-cast identifier as one of the identifiers assigned locally for a data packet.

According to one aspect of the present disclosure, there is provided a non-transitory computer-readable media storing computer instructions, that when executed by one or more processors, cause the one or more processors to perform the steps of: controlling processing of a set of data packets, using identifiers assigned locally in the system for each data packet received at an entry point in the system; and processing each data packet along a directed graph data structure based on the identifiers assigned locally, the directed graph data structure providing a network pipeline to forward the data packet.

Optionally, in any of the preceding aspects, another implementation of the aspect provides that the steps include performing operations as a classifier, the operations including: receiving the set of data packets; classifying data packets of the set of data packets; and augmenting each data packet into an internal representation including a port identifier corresponding to a packet destination of the respective data packet or a policy identifier associated with a policy, in which the port identifier or the policy identify the path traversed by each packet through the directed graph data structure; and saving the port identifier or the policy identifier in a metadata area of the respective data packet; assigning the identifiers locally to include a device identifier for each virtual network function and a datapath identifier for a unique path for the respective data packet to traverse through the network pipeline; and using the device identifier and the datapath identifier in control logic and using the port identifier or the policy identifier in the data packet to direct the respective data packet to the packet destination or a service-chain defined by a chain of virtual network functions along a path of the respective data packet traversing through the network pipeline.

Any one of the foregoing examples may be combined with any one or more of the other foregoing examples to create a new embodiment within the scope of the present disclosure.

DETAILED DESCRIPTION

Figure 1:
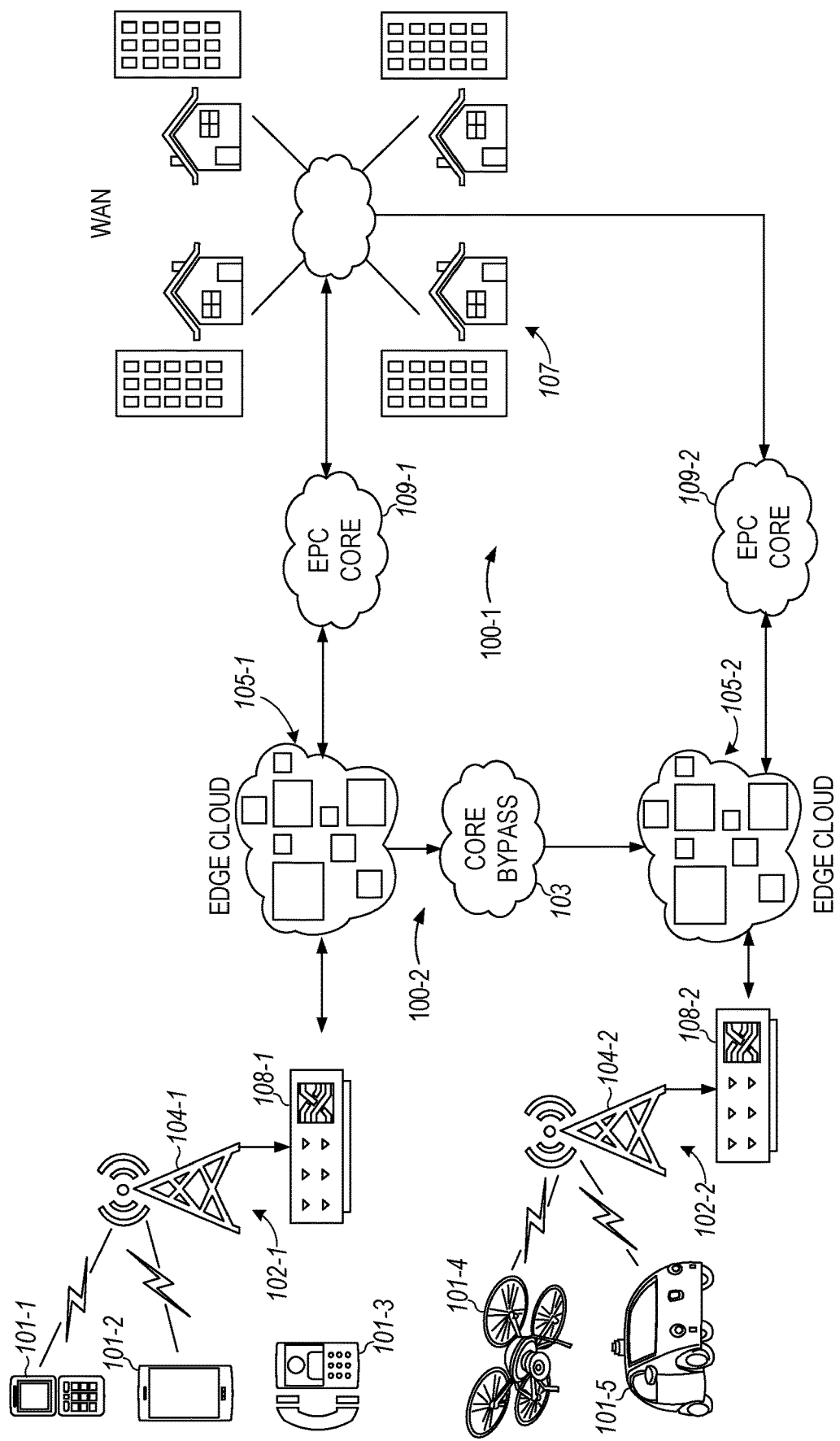
FIG. 1 is an architecture of a network that can provide communications between entities at different ends of the network, and a smaller network that can provide the communications between the same entities that are at the same different ends of the smaller network, according to an example embodiment.

In the following description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized, and that structural, logical and electrical changes may be made. The following description of example embodiments is, therefore, not to be taken in a limited sense.

The functions or algorithms described herein may be implemented in software in an embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Computer-readable non-transitory media includes all types of computer readable media, including magnetic storage media, optical storage media, and solid state storage media and specifically excludes signals. It should be understood that the software can be installed in and sold with the devices that handle event streams as taught herein. Alternatively, the software can be obtained and loaded into such devices, including obtaining the software via a disc medium or from any manner of network or distribution system, including, for example, from a server owned by the software creator or from a server not owned but used by the software creator. The software can be stored on a server for distribution over the Internet, for example.

In various embodiments, a modular software framework is used to create building blocks of components from which network services can be assembled using an architecture similar to a micro-services architecture. An architecture arranged similar to a micro-service allows a network service to be composed of one or more modules that implement sub-functions utilized for a given service. For instance, a network switch can be realized by implementing modules such as an IP header parser, a protocol classifier, a media access control (MAC) lookup, and a repackage-header. The protocol classifier module could also be used in other network functions, such as a firewall or implementation of access control lists (ACLs).

Rather than using standard micro-service platforms, the modules as taught herein are available to be connected together using a graph data structure. This capability adds a graph flow paradigm to use of micro-services. In the context of network data packet processing, the graph data structure operates as network connectivity. This enables the creation of additional virtual switches and routers to multiplex network end-points. As a result, rather than only having lookup tables as in traditional network switches or routers, graph tools are available to establish network connectivity. The graph data structure can include software tree-like data structures.

The modular capability to create services can be implemented with and used in conjunction with internally generated globally unique identifiers. These identifiers provide an internal representation of a network within the system with respect to data packets being transmitted from their respective entry points in the system to their respective destinations within the system. With respect to local operations, a system can deploy services that are offered in the system and can define network paths for packets that are passing through the system. Different network paths may be defined for different tenants, with tenant level isolation. A designated channel and different networks may be defined for each user. An internal network is for internal services, where, when traffic is received in the system, its destination can be one or more of the services that are running logically, and the traffic can be assigned to that network. The received traffic after local processing may be sent to an external network for transmission to an end-point destination over Internet, or its end-point destination may be in the local network. Some data packets may proceed through a datapath in the local network, without processing, to be forwarded to an end-point on an external network.

FIG. 1 is an architecture of a network 100-1 that can provide communications between entities at different ends of network 100-1, and a smaller network 100-2 that can provide the communications between the same entities that are at different ends of the smaller network 100-2. Data packets can be generated from user equipment, such as but not limited to UE 101-1, UE 101-2, and UE 101-3, for communication with other UE, such as but not limited to UE 101-4 and UE 101-5, via transmission over network 100-1. Since such communications can be bi-directional, UE may be referred to as a user endpoint.

In a traditional approach using network 100-1, data packets from UE 101-1, UE 101-2, and UE 101-3 can be received at tower 104-1 associated with a base station 108-1, forming a radio access network (RAN) or a virtual radio access network (VRAN) 102-1. The data packets processed at RAN/VRAN 102-1 can be transmitted to an enhanced packet core (EPC) core 109-1, which can provide IP core services for the data packets in transit. From EPC core 109-1, the data packets can be transmitted to a WAN 107, which may further process the data packets and transmit the data packets on network 100-1 to EPC core 109-2. EPC core 109-2 may also perform IP core services for the data packets. From EPC core 109-2, the data packets are transmitted to a RAN/VRAN 102-2 that includes a base station 108-2 and tower 104-2. Tower 104-2 can transmit the data packets to the appropriate end-point destination, such as but not limited to UE 101-4 and UE 101-5. The receiving end-point devices such as UE 101-4 and UE 101-5 can transmit packets back to UE 101-1, UE 101-2, and UE 101-3 over network 100-1 through the same components of network 100-1 traversed by the data packets from UE 101-1, UE 101-2, and UE 101-3.

Associated with the transmission of a data packet over a network is a latency, which is a time interval associated with processing in the network and propagation through the network. For example, in network 100-1, the transmission between UE 101-1, UE 101-2, or UE 101-3 and RAN/VRAN 102-1 may be typically have a round-trip latency of 100 µs. The transmission between RAN/VRAN 102-1 and EPC core 109-1 may be typically have a round-trip latency of 100 µs. The transmission between EPC core 109-1 and WAN 107 may typically have a round-trip latency greater than 20 milli-seconds. In this example, transmission from UE 101-1, UE 101-2, or UE 101-3 to UE 101-4 or UE 101-5 may have a round-trip latency greater than 20 milli-seconds.

The shorter network 100-2 can address the latency with the incorporation of edge cloud 105-1 and/or edge cloud 105-2. Edge computing is a method of performing data processing at the edge of the network, near the source of the data. The edge computing can be realized in a system using processing equipment such as one or more processors operating on storage devices. This system can be referred to as an edge cloud. An edge cloud may be structured with processing equipment in smaller amounts than datacenters of clouds. In the example of FIG. 1, shorter network 100-2 can facilitate communication from UE 101-1, UE 101-2, or UE 101-3 to UE 101-4 or UE 101-5 by transmitting data packets from UE 101-1, UE 101-2, or UE 101-3 to RAN/VRAN 102-1 to edge cloud 105-1 through a core bypass 103 to edge cloud 105-2 to RAN/VRAN 102-2 to UE 101-4 or UE 101-5. This path provides a shorter roundtrip path without going to EPC cores 109-1 or 109-2. Edge cloud 105-1 and edge cloud 105-2 can provide processing that performs network IP services for the data packets. Each of these configurations of network 100-2 can be structured to eliminate the largest latency such as the round-trip latency between EPC cores 109-1 and 109-2 and WAN 107 in the example discussed above with respect to network 100-1 of FIG. 1.

Network characteristics can include low roundtrip latency, for example, a roundtrip latency less than 1 milli-second. Such a characteristic can involve the location of the edge cloud processing equipment near a RAN/VRAN. An edge cloud can be implemented to process small packet sizes, for example, but not limited to, 256 bytes or less. An edge cloud can be structured for high bandwidth operation to handle a dense distribution of UEs, which includes a large number of UEs per square kilometer. An edge cloud can be structured having a per-flow configurability, having the capability to handle many types of flows, not just UE to WAN. For example, an edge cloud can be configured to communicate robotic controls. An edge cloud can be structured for network slicing including policy based bandwidth and performance. An edge cloud can be structured to integrate seamlessly with a traditional cloud network, for example as shown in FIG. 1 with WAN 107 structured as a cloud.

In various embodiments, internal IDs and a combination of software components that can be dynamically configurable in a modular framework with modules formed according to a graph data structure can be used in a runtime configuration. Each module can leverage hardware offloads and combine to form network services and/or data flow paths, thereby creating a virtual network function and a network forwarding plane into one embodiment. A net effect of creating such a network data plane in a local arrangement is that each function can be optimized to use less CPU cycles and interconnects traversed with least hops. This may provide a least latency per flow. Depending on the design of datapaths at runtime, high throughput may be achieved.

Local generation of internal IDs along with a modular framework can provide reduction of latency beyond that provided with an edge cloud structure. Such local generation can be implemented at other systems along a network other than at the edges of the network. The locally generated internal identifiers to represent data packets at the local processing systems can include a port_ID, a datapath_ID, a device_ID, and a policy_ID. The port_ID can be assigned to represent an end-point in the local network. A port_ID for the packet can be that of destinations other than the destination of the data packet as provided in the packet header received from an external network, as per policy. While doing so, the packet would eventually reach the destination of the data packet as provided in the data packet header, passing through other network functions as referenced by the port_ID. The port_ID can also be assigned to ports of each virtual network function, either in a chain or a point prior to exit from the virtual network function. The former is to be able to chain the ports in sequence in a graph. Examples of latter are VPN, a firewall (FW), or an encapsulation implementation like a virtual extensible LAN (VXLAN) encap module each of which have multiple sub-functions within each. A port_ID can be assigned to each sub-function port. This is to enhance possibility of creating an error detection where if an error occurred in a sub-function, the packet can exit and the graph would have such exit points connected to a common error handler. The datapath_ID can be assigned to represent a local network path, where devices in the local network path can be assigned a device_ID. A composition of set of modules representing a service can be assigned a device_ID. The policy_ID can be assigned to correlate a data packet to a datapath for the data packet to take one of many well defined processing paths. These four identifiers can be used to design pipelines to forward a data packet from an entry point (ingress) in the system to a destination within the system or choose one of many alternate processing paths as it traverses the system and exits out (egress).

Figure 2:
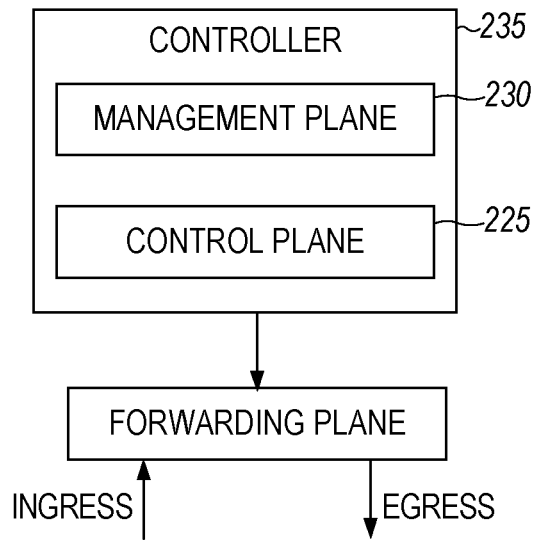
FIG. 2 is a forwarding plane, a control plane, a management plane, and an associated controller, according to an example embodiment.

In networking, decisions on how to process the routing of data packets can be assigned to one of three planes of operation: a forwarding plane, a control plane, and a management plane. The forwarding plane, also referred to as a data plane, moves packets from input to output. The control plane configures data plane and determines how packets should be forwarded. The management plane configures the control plane. FIG. 2 is a forwarding plane 220, a control plane 225, a management plane 230, and an associated controller 230. Forwarding plane 220 handles packet ingress and packet egress. All packet data such as headers, payload, checksums and locally produced packet metadata are in the domain of the data plane as they are used in the context of each packet to be processed. The control plane 225 and management plane 230 serve the forwarding plane (data plane) 220 that bears the traffic for which the network is designed to carry. In local generation of internal IDs, the datapath_ID and the device_ID are used in conjunction with port_ID and policy_ID in the control plane. Only port_ID and policy_ID are carried in the data plane as packet metadata.

Local generation of identifiers can include generation of a host_ID, where each physical host can be assigned a host_ID representing a network host (like a network interface card) rather than a computing machine. The association of host_ID may be maintained only in the control/management plane along with associations of the device_ID and the datapath_ID. Additional identifiers can be defined for network connectivity from the local system to the external world such as for a VXLAN identifier (VNID), a queue-pair ID for remote direct memory access (RDMA), etc., all confined to control plane only. However, by defining just the four global identifiers, port_ID, datapath_ID, device_ID, and policy_ID, entities can be established locally for network functions and the forwarding plane, while all identifiers typically used in traditional network management can still be used seamlessly in a control plane. Using these identifiers along with the capability for selectively combining individual modules for different services, most common networking model can be realized. By addition of various encapsulation mechanisms built as modules, one can also extend it to networks outside the system into the cloud. The local identifiers are only effective locally until the packet exits the system thereby not limiting the use cases in any way.

Locally assigned identifiers in a system (along with the capability for selectively combining individual modules for different services) can be implemented as a network in the system with an absence of traditional network stack. In an embodiment, a core of a local network with an absence of a traditional network stack can be arranged with an architectural structure that does not primarily use transmission control protocol/Internet protocol (TCP/IP) or any standard network stack within the core. In an embodiment, network entities are translated to internal identifiers and each packet forwarded in the network of the system has a metadata area to carry a packet state. All network components can be treated as stateless, as states that are needed are contained within each packet as metadata. In addition, a network data plane of the system can move data packets as memory reads from a fixed location or as a memory move. In an embodiment, a local network with an absence of a traditional network stack may include zero-copy by design, which can use poll mode drivers (PMD) with kernel bypass and move a batch of packets to user-mode memory with no kernel copy. The kernel is a program at the center of a processing system's operating system (OS). It is the core that provides basic services for the OS. Zero-copy is a programming paradigm in which a network packet data is located in one memory location in a system from the time it arrives until it leaves the physical system. Zero-copy is realized by processing operations in which the CPU does not perform the task of copying data from one memory area to another. This technique is used to reduce time delays incurred for moving data in the memory.

An approach to a local network with an absence of a traditional network stack in a system can include a modular design. The modular design can allow for code reuse, where code is software providing instructions to be executed by one or more processes. Code reuse allows different functions to use common software sub-components. A directed graph of nodes represented by modules allows for construction of a processing path for each data packet that can be designed to use least code in CPU in a data processing structure. Such a least code path may be realized by designing an optimal graph. The use of modular software components can also provide leverage for hardware offload, which can provide for highly configurable processing.

A local network with an absence of a traditional network stack in a system using directed acyclic graph (DAG) can be optimized for minimal table lookups and minimal hops for forwarding data packets as compared to the use of lookup tables in traditional switches. In a traditional network architecture, switches and routers have special purpose hardware for table lookup acceleration. Virtual switches and routers having lookup tables incur high latency penalties. In contrast, a local network with an absence of a traditional network stack in a system, as taught herein, with the locally generated identifiers listed herein, such as port_ID, device_ID, policy_ID and datapath_ID for each data packet along with the DAG and optimized lookups, can provide significantly lower latency than traditional network architectures.

The configurable architecture provided by the modular design provides the capability to build all network functions, such as switches, routers, firewalls, etc., as a selected combination of software modules. In addition, individual modular software components can be added according to particular characteristics for processing a data packet in a forwarding plane. A modular architecture can support multiple external networks and network types and can be arranged as 100% backward compatible. The modular architecture can support sockets, VMs, containers, and VNFs. A network socket is an endpoint from where the network data packets originates or terminates into an application. This can be abstracted within a software module. A container is similar to a VM in networking, where each container or a VM has one or more virtual network adapter (vNIC), which can be connected to a virtual switch (vSwitch), over which inbound and outbound traffic is forwarded. Software modules can abstract a vNIC and can be integrated into modular architecture.

Figure 3:
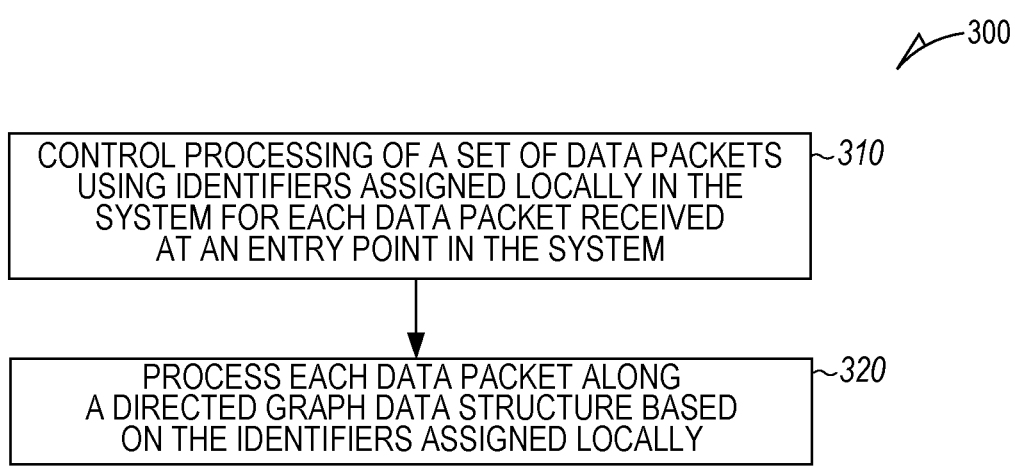
FIG. 3 is a flow diagram of a computer-implemented method of local processing of data packets in a system, according to an example embodiment.

FIG. 3 is a flow diagram of a computer-implemented method 300 of local processing of data packets in a system. The system may be an edge cloud or other processing system that interacts with a communication network. The system may be arranged to work with and in proximity with a cloud. Method 300 can be implemented as a processor-implemented method such as a computer-implemented method that can be implemented by a set of one or more processors executing one or more sets of instructions stored in one or more memory storage devices. The sets of instructions can be structured as individual modules of instructions.

At 310, processing of a set of data packets is controlled using identifiers assigned locally in the system for each data packet received at an entry point (ingress) in the system. An ingress and a destination may be realized in a number of different formats depending on the individual configurations to which the ingress and the destination are components. The ingress of one or more of the data packets of the set can be different from ingress for other data packets of the set. The ingress can be network interface cards (NICs) that receive data from one or more networks external to the system. The ingress can be virtual network interface cards (VNICs), where a VNIC is based on a physical NIC. The ingress can be application outputs that are internal to the system. The destination can be an application residing locally in the system. The destination can be out of the local system in which case the packet will be delivered out of (egress) appropriate NIC or vNIC. When a packet exits the system, all locally stored metadata and identifiers will be stripped off and original packet exits out.

At 320, each data packet is processed along a directed graph data structure based on the identifiers assigned locally. A graph structure has one or more nodes interconnected such that each interconnect would be called an edge of the graph. When traversing through the graph data structure, one can only proceed in one direction at each edge, called a directed graph; or alternately some edges may allow traversal in front and back direction, called an undirected graph. Both directed and undirected graphs can be used for a network pipeline. However, the undirected graph could result in endless circular loops for traversing packets, thereby requiring special algorithms to circumvent such loops. A directed graph does not have such a problem. However, this limits usage of each vertex or node, wherein each vertex or node can be used in only one direction, requiring additional paths to replicate a same node to be used in the other direction. In the method suggested, the directed graph is chosen to avoid additional processing required for circular loop correction and replicating nodes are not a big cost to pay for the lower latency objective. The network pipeline is a processing pipeline, where nodes of the network pipeline provide processing according to implementation in the software module at the node, the node itself may have additional tables that match the parameters in the packet metadata to arbitrate its path.

The identifiers assigned locally for a data packet can include a port identifier (port_ID) and a policy identifier (policy_ID). The port_ID can correspond to a packet destination or a virtual network function or a chain of virtual network functions. The policy_ID is associated with a policy, where the policy defines a factor for selecting a path taken by the data packet through the network pipeline. The port_ID and/or the policy_ID for a data packet of the set can be stored in a metadata area of the data packet. In addition, variations of method 300 or methods similar to method 300 can include assigning a multi-cast identifier as one of the identifiers assigned locally for a data packet to support egress multicast (multicast of destination). The multi-cast identifier, if used for a data packet, can be saved in the metadata area of the data packet.

If a policy for a data packet defines that the data packet is to be processed by one or more VNFs in a chain, the port_ID of the first VNF in the chain can be used as the port_ID for the data packet. In such a case, the directed graph data structure is configured such that rest of the flow of the given data packet is well defined. A criterion for a well-defined path may include there being only one path for a respective data packet along a processing pipeline in forwarding the data packet for a combination of port_ID and policy_ID. With multiple paths in the forwarding plane, the policy_ID distinguishes which path to take to reach the same port_ID. In an embodiment, before exiting the system, such as an edge network or a local network with an absence of a traditional network stack located away from the edges of a network, the data packet may be encapsulated or encrypted using a VNF, such as a VPN or VXLAN or IP-GRE tunnel end-point function, at the end of the local network pipeline for the data packet. A data packet traversing through the network pipeline means the data packet is processed at the nodes of the network pipeline prior to presentation at the data packet destination.

Variations of method 300 or methods similar to method 300 can include a number of different embodiments that may be combined depending on the application of such methods and/or the architecture of systems in which such methods are implemented. Such methods can include processing the data packet, about which identifiers are assigned locally in the system for the data packet received at an ingress in the system, at one or more virtual network functions of the system based on the identifiers assigned locally. Each virtual network function can be deployed as a set of nodes in the directed graph data structure. The identifiers assigned locally can include a device identifier for every virtual network function and a datapath identifier reflecting the network of the location of the virtual network function. The device identifier and the datapath identifier can be maintained in the control plane, while the port_ID and/or the policy_ID are assigned to a packet and saved in the metadata of the data packet. The packet metadata resides within the forwarding plane. The device identifier and the datapath identifier can be used to direct the respective data packet to the packet destination or through a service-chain defined by a chain of virtual network functions.

Such variations of method 300 or methods similar to method 300 can include creating the virtual network functions, configuring the virtual network functions dynamically at runtime, and connecting the created virtual network functions into a data pipeline that forms a network topology service. The network topology service can include one or more sub-functions capable of being assembled as a virtual network function in a micro-services-like architecture.

Variations of method 300 or methods similar to method 300 can include performing operations as a classifier. The operations can include receiving the set of data packets; classifying the data packets; augmenting each data packet into an internal representation including a port identifier and a policy identifier; and saving the port identifier and the policy identifier in a metadata area of the respective data packet. Augmenting a data packet into an internal representation can include associating identifiers with the data packet that is forwarded in a system that receives the data packet. In addition to saving the port identifier and the policy identifier in the metadata area of each data packet, method 300 or methods similar to method 300 can include saving, in the metadata area of each data packet, results of processing each data packet as it traverses through the directed graph data structure, which helps in creating a stateful packet processing. A stateful packet processing maintains state of the packet so it can be used in another node along the data pipeline before the packet exits. Example of such a service would be a stateful firewall that detects the source information in a module, then checks for various factors in subsequent processing and then in some module down the pipeline, it decides to allow packets go through, or drop them or filter them to a quarantined location.

Figure 4:
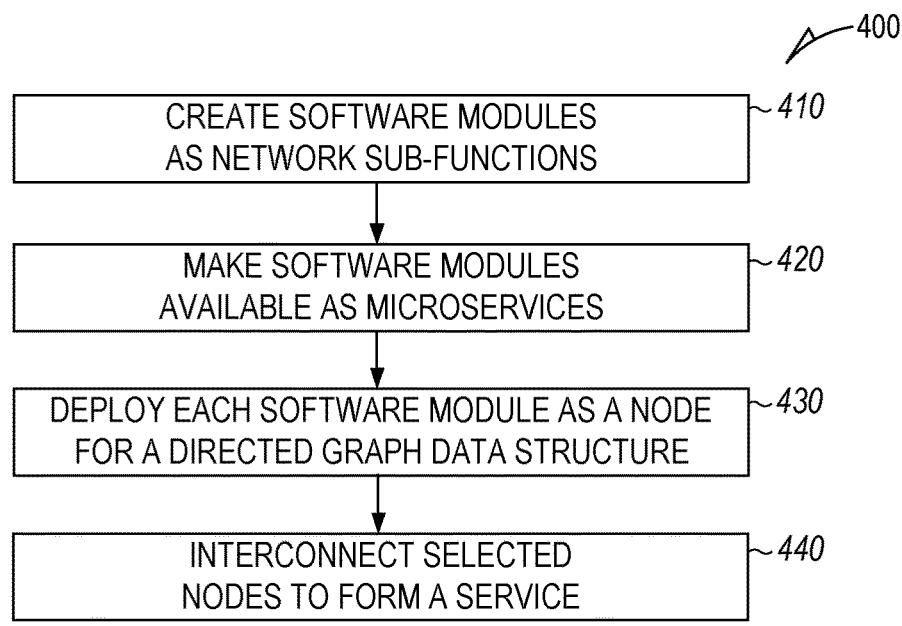
FIG. 4 is a flow diagram of a method of modularizing services for forwarding data packets in a system, according to an example embodiment.

FIG. 4 is a flow diagram of a method 400 of modularizing services for forwarding data packets in a system. The system may be an edge cloud or other processing system that interacts with a communication network. The system may be arranged to work with and in proximity with a cloud. Method 400 can be implemented as a processor-implemented method such as a computer-implemented method that can be implemented by a set of one or more processors executing one or more sets of instructions stored in one or more memory storage devices.

At 410, software modules are created as network sub-functions. The modules can be built starting from or similar to a current modular framework. For example, a starting framework can include, but is not limited to, a Berkeley Extensible Software Switch (BESS). BESS is a software switch designed to be extensible and to support network functions virtualization, in addition to traditional virtual networking tasks. Modules are the basic building blocks of BESS, where each module performs some particular task on packets. For example, a module can remove a VLAN tag from a packet header. Operators or external controllers specify what kind of modules to use, how many of them, and how to interconnect them in a datapath pipeline such that the behavior of the BESS implementation will depend on how modules are composed and configured in the datapath pipeline. BESS framework includes some standard packet processing modules such as mac-address lookup, VXLAN encapsulation, Berkeley packet filer, L3-lookup etc. These can be configured in a graph to represent a software switch or a router in standard networking. BESS includes 'port' modules that are used as locations at which packets may enter or exit the core software switch. A port can connect to a physical network interface or present a virtual network interface to a virtual machine, to a containerized application, or an abstracted socket to a normal process running in user space. The modules of BESS are chunks of code that allow the core networking software to process packets. Modules receive and release packets via input and output gates of the software modules. Process transitions between modules can be performed in BESS using a call link, which is a mechanism in which a current module calls the next module in the connected modules. BESS modules can perform one or more atomic functions. An atomic function is a function whose execution cannot be interrupted.

At 420, the created software modules are made available as micro-services. The software modules can be generated as a collection of network data packet processing functions. Examples of such functions include, but are not limited to, protocol classifier, VXLAN encap/decap, ports switching, mac-address swap, etc. At 430, each software module is deployed as a node for a directed graph data structure. In some cases, each module may be deployed as a node in a tree, where the tree is formed by connecting edges interconnecting modules that create a service. One or more of the software modules may be structured as a set of connected sub-modules where the input gate to the set is an input gate to the software module and the output of the set is an output gate of the software module.

At 440, selected nodes are interconnected to form a service. Inter-service processing can be based on a graph edge or an aggregate such as, but not limited to a switch or router or other virtual network functions. In deployment, data can flow from a physical network port into the system in a physical machine, or a virtual NIC in case of virtual machines and, after processing in the system, the data can flow out a physical or a virtual NIC port respectively.

The interconnection to form the service can depend on the virtual network function or a network data path as needed. The interconnection can be performed in the management plane including the mapping of local identifiers. The mapped local identifiers include, for each VNF or network path in the pipeline, a device_ID and a datapath_ID. The device_ID can provide a unique ID for each virtual network function implemented in the forwarding plane. The datapath_ID can provide a path along directed graph to a destination, which can be an end-point for a given data packet either to location with the system that receives the data packet from an ingress point in the system or to a location external to the system. The control plane can transform policy information into one or more mapping tables to be used by software in the node and graph paths. The mapping tables can include lookup tables that provide parameters for gate lookup of the individual nodes or any criterion to select a gate or process in any custom way.

The control plane has the logic to translate rules to graph edges and lookup tables. The control plane provides multi-level control logic having local views across the software module nodes. The control plane can be realized with a hierarchical control plane layout for scale-out, which is a growth architecture or method that focuses on horizontal growth, where horizontal growth is the addition of new resources. Though addition of new resources in such a growth architecture is facilitated instead of increasing the capacity of current resources, the control plane hierarchical layout may include increasing capacity of current resources.

Datapaths and mapping of datapath_IDs and device_IDs for virtual network functions performed in the control can be performed prior to runtime, which the time frame in which data packets are received and forwarded based on the datapath_IDs and device_IDs for the individual data packets. The generation of the datapaths and associated IDs can be performed based on user criteria for network processing by the system, such as, but not limited to, forming an edge cloud. At runtime, other local identifiers are used in the forwarding of data packets in the system to their appropriate destination or pass though appropriate virtual network functions along an abstracted network path.

In a runtime process, data packets received from an entry point for the system are classified, which can include assignment of local identifiers to the data packets. For example, a port_ID and/or a policy_ID can be assigned to each data packet and saved in a metadata area of each data packet. The port_ID and the policy_ID are associated with a datapath_ID and a device_ID in the control plane. Processing at each software module node in the datapath corresponding to the port_ID and/or the policy_ID uses only the internal IDs, rather than internet protocol IDs from the source for network transport of the data packet. Parsing the packet for protocol IDs would consume more CPU cycles than accessing metadata that resides at a fixed location in the packet buffer stored locally per packet. The set of internal identifiers for a data packet, port_ID, policy_ID, datapath_ID, and device_ID (and multicast_ID if present) can be used to manage the processing of the data packet in the forwarding plane. Custom routing in the forwarding plane can be achieved using a combination of graph paths and aggregator hash table lookups to reach a target end-point. Such a combination of graph edge and hash lookup may achieve a least code path for processing a data path as opposed to only lookup tables in traditional networking devices. In a virtual network all computations are done by a CPU, and lookup tables consume more CPU cycles than a path arbitration in a directed graph due to its inherent design. In a hardware based networking devices, special purpose silicon chips (ASICS) are used to speed up the lookup tables, whereas having a least code path in a CPU can lead to least latency in case of a virtual network, while the modular design allowing each module to leverage h/w capabilities available to further improve latencies.

Figure 5:
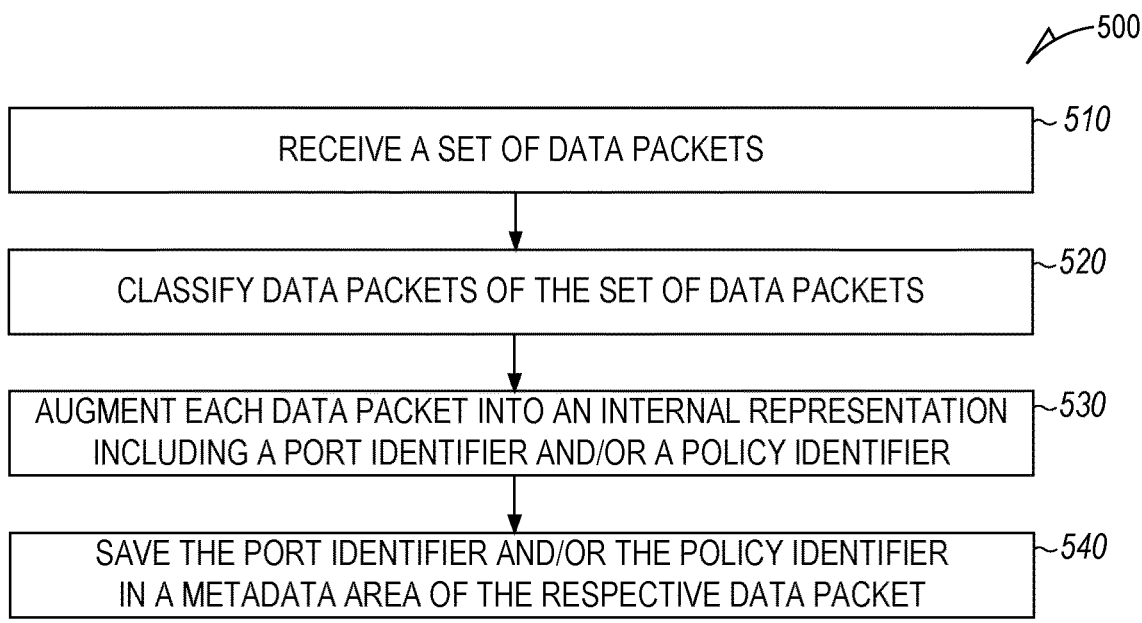
FIG. 5 is a flow diagram of a method of preparing data packets for forwarding in a system, according to an example embodiment.

FIG. 5 is a flow diagram of a method 500 of preparing data packets for forwarding in a system. The system may be an edge cloud or other processing system that interacts with a communication network. The system may be arranged to work with and in proximity with a cloud. Method 500 can be implemented as a processor-implemented method such as a computer-implemented method that can be implemented by a set of one or more processors executing one or more sets of instructions stored in one or more memory storage devices.

At 510, a set of data packets is received. The set of data packets can be received at ingress point that may be realized in a number of different formats depending on the individual configurations to which the entry points are components. The ingress points can be NICs that receive data from one or more networks external to the system. The ingress points can be VNICs in case of virtual machines or a container. The ingress points can be application outputs that are internal to the system such as sockets.

At 520, the data packets are classified. Each data packet can be classified by examining the contents of the data packet once, for example the header of the data packet. At 530, each data packet is augmented with an internal representation including a port_ID and/or a policy_ID within its metadata. The port_ID can correspond to a packet destination of the data packet or a virtual network function within the system. If a policy for a data packet defines that the data packet is to be processed by one or more VNFs in a chain, the port_ID of the first VNF in the chain can be used as the port_ID for the data packet. At 540, the port_ID and/or the policy_ID are saved in a metadata area of the respective data packet. The metadata region of each data packet can be used to store results from the processing of the data packet along the path defined by the datapath_ID. The datapath_ID and the device_ID are predefined when creating the network pipelines defined in 400. The port_ID and the policy_ID are assigned to the packets at runtime.

In various embodiments, a non-transitory machine-readable storage device, such as computer-readable non-transitory media, can comprise instructions stored thereon, which, when performed by a machine, cause the machine to perform operations, where the operations comprise one or more features similar to or identical to features of methods and techniques described with respect to method 300, method 400, and method 500, variations thereof, and/or features of other methods taught herein such as associated with FIGS. 1-7. The physical structures of such instructions may be operated on by one or more processors. For example, executing these physical structures can cause the machine to perform operations comprising controlling processing of a set of data packets, using identifiers assigned locally in the system for each data packet received at an ingress point in the system; or a virtual network function within the system; and processing each data packet along a directed graph data structure based on the identifiers assigned locally, the directed graph data structure providing a network pipeline to forward the data packet.

The instructions can include a number of operations. The operations can include performing operations as a classifier. The classifier operations can include receiving the set of data packets; classifying each data packet of the set; augmenting each data packet into an internal representation including a port_ID and/or a policy_ID; and saving the port_ID and/or the policy_ID in a metadata area of the respective data packet. The port_ID can correspond to a packet destination of the respective data packet and the policy_ID is associated with a policy. The port_ID and/or the policy_ID identify the next destination in the path traversed by each packet through the directed graph data structure in which the-network pipeline includes none, one, or more than one virtual network function, where the virtual network functions are dynamically configurable. Operations in a management plane can include assigning the identifiers locally to include a device_ID for each virtual network function and a datapath_ID for a unique path for traversal through the network pipeline or virtual network functions along the path. The device_ID and the datapath_ID can be used in control logic, while the port_ID and/or the policy_ID can be held in the data packet to direct the respective data packet to the packet destination or a service-chain defined by a chain of virtual network functions along a path of the respective data packet traversing through the network pipeline.

Further, machine-readable storage devices, such as computer-readable non-transitory media, herein, are physical devices that stores data represented by physical structure within the respective device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices. The machine-readable device may be a machine-readable medium such as memory 703 of FIG. 7. While memory 703 is shown as a single component unit, terms such as "memory," "memory module," "machine-readable medium," "machine-readable device," and similar terms should be taken to include all forms of storage media, either in the form of a single medium (or device) or multiple media (or devices), in all forms. For example, such structures can be realized as centralized database(s), distributed database(s), associated caches, and servers; one or more storage devices, such as storage drives (including but not limited to electronic, magnetic, and optical drives and storage mechanisms), and one or more instances of memory devices or modules (whether main memory; cache storage, either internal or external to a processor; or buffers). Terms such as "memory," "memory module," "machine-readable medium," and "machine-readable device," shall be taken to include any tangible non-transitory medium which is capable of storing or encoding a sequence of instructions for execution by the machine and that cause the machine to perform any one of the methodologies taught herein. The term "non-transitory" used in reference to a "machine-readable device," "medium," "storage medium," "device," or "storage device" expressly includes all forms of storage drives (optical, magnetic, electrical, etc.) and all forms of memory devices (e.g., DRAM, Flash (of all storage designs), SRAM, MRAM, phase change, etc., as well as all other structures designed to store data of any type for later retrieval.

In various embodiments, a system to supply services to data packets being forwarded in the system, based on internal representation of the data packets, can comprise a memory storage comprising instructions and one or more processors in communication with the memory storage. The one or more processors can execute the instructions to: control processing of a set of data packets using identifiers assigned locally in the system for each data packet received at an entry point in the system; and process each data packet along a directed graph data structure based on the identifiers assigned locally, the directed graph data structure providing a network pipeline to forward the data packet.

Variations of a system to supply services to data packets being forwarded in the system, based on internal representation of the data packets, as taught herein, can include a number of different embodiments that may be combined depending on the application of such systems and/or the architecture in which systems are implemented. The operations of such a system can include operations in which the identifiers assigned locally for a data packet include a port identifier corresponding to a packet destination and/or a policy identifier associated with a service level agreement policy, the service level agreement policy defining a factor for selecting a path taken by the data packet through the network pipeline. The one or more processors can execute the instructions to process the data packet at one or more virtual network functions of the system based on the identifiers assigned locally, with each virtual network function being deployed as a set of nodes in the directed graph data structure. The identifiers assigned locally can include a device identifier for every virtual network function and a datapath identifier corresponding to a network mapping to which the respective data packet belongs, where the device identifier and the datapath identifier are managed in control logic of the system separate from the data packet and are used to direct the respective data packet to the packet destination or through a service-chain defined by a chain of virtual network functions. The one or more processors can execute the instructions to create the virtual network functions, to configure the virtual network functions dynamically at runtime, and to connect the created virtual network functions into a data pipeline that forms a network topology service. The network topology service can include one or more sub-functions capable of being assembled as a virtual network function in a micro-services-like architecture. The identifiers assigned locally for a data packet can include a multi-cast identifier.

Variations of a system to supply services to data packets being forwarded in the system, based on internal representation of the data packets, as taught herein, can include the one or more processors to execute the instructions to perform operations as a classifier. The classifier operations can include operations to: receive the set of data packets; classify the data packets; and augment each data packet into an internal representation including a port identifier and/or a policy identifier; and save the port identifier and/or the policy identifier within a metadata area of the respective data packet. Results of processing operations along the network pipeline can be saved in the metadata area of the respective data packet.

Figure 6:
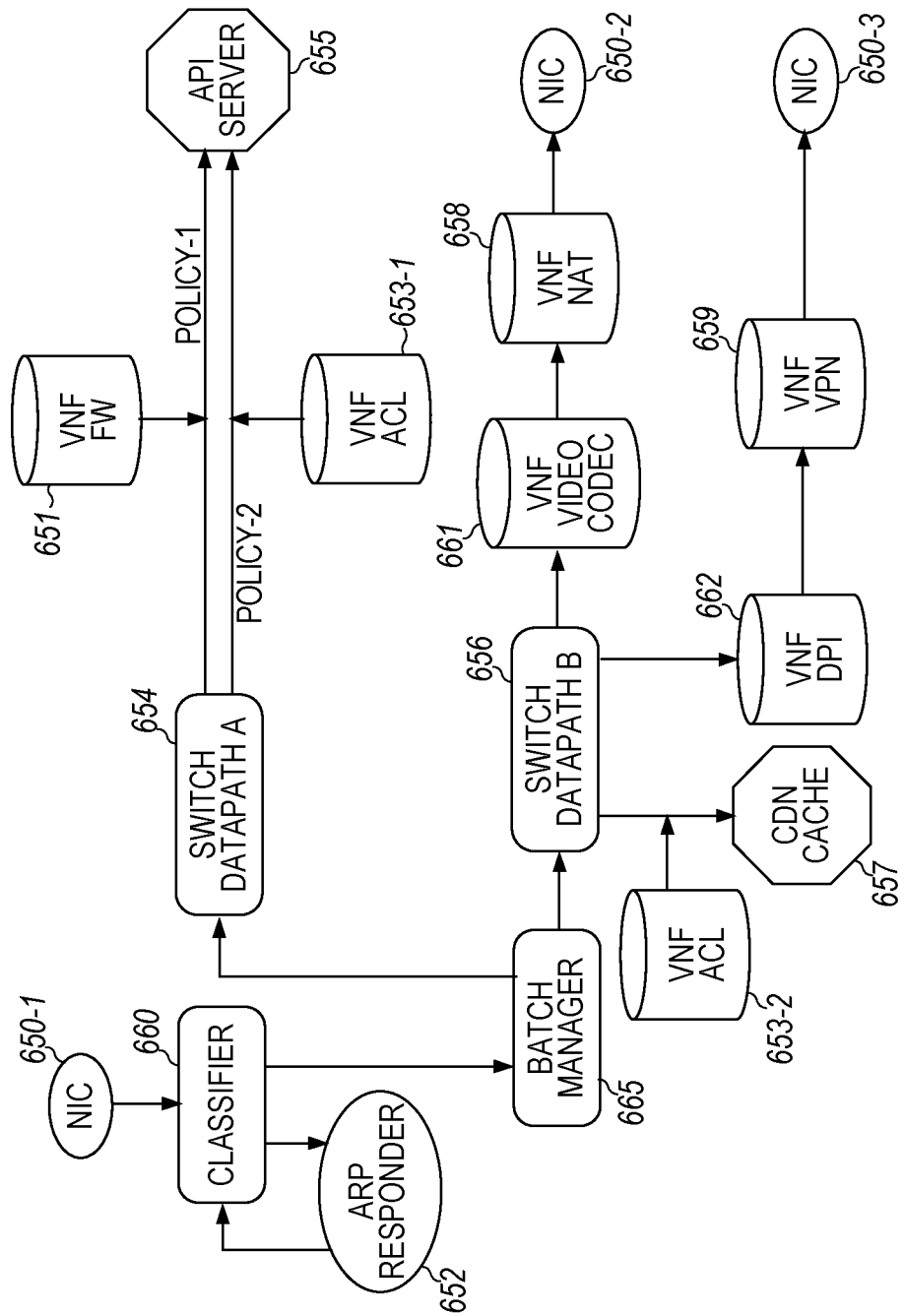
FIG. 6 is an example of different datapaths along which data packets can be processed, where the datapaths and the data packets are related to internally generated representations for the data packets in a system, according to an example embodiment.

FIG. 6 is an example of different datapaths along which data packets can be processed, where the datapaths and the data packets are related to internally generated representations for the data packets in a system. Data packets can be received at a NIC 650 of a system and provided for operation by a classifier 660, which is a software module for the processing of data packets. Classifier 660 examines the IP/TCP header of each received data packet to determine the end-point details of each received data packet. Typically, the IP/TCP header of a data packet includes a set of five values that comprise a TCP/IP connection, where the set is commonly referred to as a 5-tuple. The set includes a source IP address, a source port number, a destination IP address, a destination port number, and a protocol in use. Of these values in the data packet header, the source IP address and the destination IP address are the primary 5-tuple components, where the source IP address is the IP address of the network that creates and sends the data packet, and the destination IP address is the recipient of the transmitted data packet. The 5-tuples of data packets can be used to identify key parameters for creating a secure, operational, and bidirectional network connection between two or more remote and local machines.

Based on the destination in IP/TCP header of each data packet, classifier 660 can assign a port_ID to each data packet. Classifier 660 has list of port_IDs that are local to the system, where the system can be a component of a network for the data packets. If a mapping of an IP address of a data packet to a port_ID is not found in the list for the data packet, classifier 660 can drop the data packet. A policy may be assigned by user during configurations pertaining to a 5-tuple and/or other specifications for each data packet. Based on the policy configuration for a data packet, classifier 660 can assign a policy_ID to each packet. Once a data packet is classified, a port-ID for the data packet corresponding to destination for the data packet can be added to a metadata region of the data packet. If a policy is defined, the classifier 660 can add a policy_ID for the data packet to the metadata area of the data packet. A policy_ID may define a distinct path in the pipeline or sometimes along same path it may define quality of service such as bitrate for that flow or the packet priority. Once a data packet is classified, all forwarding of the data packet along a processing path from classifier 660 can be accomplished using internal IDs in the metadata area of the data packet.

Classifier 660 can direct the received data packets to an address resolution (ARP) responder 652. ARP is a protocol for mapping an IP address to a physical machine address that is recognized in a local network. ARP responder 652 can respond to an ARP request and return a corresponding address to classifier 660. Classifier 660 can provide classified data packets to a batch manager 665. Batch manager 665 is a software module that can manage batching data packets having a common destination and common path for forwarding along the path beginning from respective gate of batch manager 665 corresponding to each data path or a data path/policy combination. Batch manager 665 can also manage scheduling tasks. For example, batch manager 665 can, but is not limited to, manage scheduling tasks for load balancing functions.

The processing along data paths can process from gates of batch manager 665 based on the classifier assigned port_ID, policy_ID, or port_ID and policy_ID that can be read from the metadata area of each data packet. In the non-limiting example of FIG. 6, data packets are sent on datapath A or datapath B based these internal identifiers. Datapath A includes a path from batch manager 665 to switch 654 and datapath B includes a path from batch manager 665 to switch 656. Switch 665 and switch 654 are software modules that are devices for the flow of data packets and are assigned device_IDs. Each software module along the paths chosen in FIG. 6 are devices for the flow of data packets and are assigned device_IDs. These devices include a FW VNF 651, an ACL VNF 653-1, a video codec VNF 661, a network address translation (NAT) VNF 658, an ACL VNF 653-2, a deep packet inspection (DPI) VNF 662, and a VPN VNF 659. NAT is a mechanism to remap one IP address space into another by modifying network address information in the IP header of packets while they are in transit across a traffic routing device. DPI is a type of data processing that can examine details of the contents of the data being sent and may re-route the data accordingly. It in combination with filtering can enable advanced network management, user services, and security functions as well as internet data mining, eavesdropping, and internet censorship.

A software device may have multiple output gates. For example, switch 654 has two output gates and switch 656 has three output gates. All flows in the paths shown in FIG. 6 can be managed using look-up tables configured in a control plane using a controller, such as controller 235 of FIG. 2. The controller can configure devices in the various paths from ingress to egress in a system with the appropriate tables, which can include tables for classifiers such as classifier 660, switches such as switches 652, 656, and other software modules to process data packets such as routers, virtual tunnel endpoint instances, and other forms of tunnel endpoint instances. With a module device having multiple output gates, the module device can use its look-up tables and the port_ID from the metadata of the data packet being processed by the module policy to determine which gate the data packet is directed for its particular flow.

For example, switch 656 can direct data packets to the gate of switch 656 that is part of the path to a content delivery network or content distribution network (CDN) cache 657 as a destination for data packets that have a port_ID that identifies CDN cache 657 as the data packet destination. A CDN cache is a cache for a CDN, where a cache is data storage typically arranged to quick access, for a CDN. A CDN is a geographically distributed network of proxy servers, which are intermediary servers, and their data centers. Along the path to CDN cache 657, these data packets are operated on by ACL VNF 653-2. This path is a defined path for the data packets having a port_ID that identifies CDN cache 657 as the data packet destination, since this is the only path from switch 656 to CDN cache 656.

Switch 656 can direct data packets to the gate of switch 656 that is part of the path to NIC 650-3 as a destination for data packets that have a port_ID that identifies NIC 650-3 as the data packet destination. Along the path to NIC 650-3, these data packets are operated on by DPI VNF 662, and a VPN VNF 659. This path is a defined path for the data packets having a port_ID that identifies NIC 650-3. In the non-limiting example of FIG. 6, switch 656 also can direct data packets to the gate of switch 656 that is part of the path to NIC 650-2 as a destination for data packets that have a port_ID that identifies NIC 650-2 as the data packet destination. Along the path to NIC 650-2, these data packets are operated on by video codec VNF 661, and a NAT VNF 658. This path is a defined path for the data packets having a port_ID that identifies NIC 650-2. Each gate of switch 656 is mapped to only one path to one destination, allowing data packets to these destinations to be assigned uniquely to their respective paths by the port_ID in their metadata.

The output gates of switch 654 are mapped to two different paths to an application programming interface (API) server 655. An API server is a platform to manage, deliver, and secure APIs across different channels. To determine which path to direct data packets from switch 654 to API server 655, switch 654 examines a policy_ID in the metadata of each data packet. The policy_ID can be used with a look-up table to map a policy from to a path. Policy-1 defines the path from switch 654 to API server 655 in which data packets are operated on by FW VNF 651. Policy-2 defines the path from switch 654 to API server 655 in which data packets are operated on by ACL VNF 653-1. A distinct policy_ID, which can be saved in packet metadata to map to policy, can be defined in the control plane or in a management plane.

Flows that follow particular paths in the modular architecture demonstrated in FIG. 6 follow graph paths from connecting selected modules to form datapaths. The modular architecture can initially be structure using conventional modular structures such as, but not limited, to BESS modules. For instance, a network function can be implemented using existing BESS modules or set of newly created modules. These network functions can be realized as VNFs. A single classification can be used for an entire flow even though the flow involves multiple modules. In addition, the single classification across multiple nodes of a system, where the nodes are different sub-systems of the system. For example, the nodes can be different physical equipment with each receiving data. The VNFs in the modular architecture can operate on data packets based on the information in the metadata area of the data packets. However, some VNFs will examine more than the metadata of a data packet, such as examining the packet header of the data packet. The metadata may include information other than information inserted via a classifier, such as classifier 660. For example, IP headers can be added to metadata for such processes as VXLAN encap/decap using a module such as a VXLAN manager module and not a classifier.

In various embodiments, network functions are mapped to sets of software modules and network connections to such network functions can be implemented as one or more API calls. This structure can allow for the execution of the network function or execution of forwarding plane logic using a least amount of CPU instructions. Use of a modular framework can provide for optimization of resource management. A modular framework using atomic functions and custom internal network identifiers, as taught herein, provides an efficient network processing to forward data packets.

There has been a number of ways resource optimization is performed in data and network computing. There are algorithms for resource scheduling, resource management algorithms, and algorithms to reduce instructions needed to process a task. An environment, as taught herein, can be created leveraging a modular framework with atomic functions that allows a mechanism to optimize network performance in a manner better than most schemes available today.

A modular framework referenced here is one that allows creation of small executable modules of code that can be run, interact, and exchange data in a specified runtime environment. Examples of such modular frameworks that can be used as a starting framework are vector packet processing (VPP), BESS, Click, and other processing entities. Click is a modular framework for routers. These frameworks provide an execution mechanism that will instantiate the small code modules and can be programmed to work as a super-module, meaning, with additional code, the modules can be made to work together exchanging data.

Another advantage of modular architecture is that a set of atomic functions can be implemented as modules. For instance, sub-functions can be implemented such that, when segmentation/de-segmentation of jumbo packets are implemented as a module, the module can perform the same operation in software or offload it to hardware if supported. Software modules can be implemented in the same manner with sequencing operation, such as explicit congestion notification (ECN) or class of service (CoS) flow control for priority-based flow control (PFC) and many other operations. This not only allows for commodity hardware to be used in leveraging software, but it can provide leverage for enhanced performance, when proper hardware is available. In FIG. 6, the links between software modules between ingress and egress illustrate how data packets logically flow, even though physically the data packet can be stationary at one memory location and all modules access it directly using same memory pointer.

Scheduling tasks can be more efficient with atomic functions. Though an atomic function works best as scheduling unit, it is rarely used to advantage in scheduling schemes because most old CPUs don't support atomic operations. With currently available support for atomic operations in programming, like in C++ 11 and beyond, as well as native support in modern CPUs, one or more of atomic operations can be assembled within a module. An added advantage of such processing is that costly synchronization mechanisms such as kernel mutex can be avoided. Since the BESS framework can leverage the concept of atomicity in architecture, a modular framework similar to the BESS framework can be used to implement sub-function atomicity.

A modular framework allows packet processing to be performed in a number of different ways. As an example, in one approach, data packets are processed sequentially from start to finish across all modules. A classify module can examine parsed information in the metadata of a data packet from a header parser that is a previous module in a processing path. Depending on results of the classifier operation placed in the metadata of the data packet, a connection multiplexer can arbitrate the data packet to go to a local container, as a destination, or to be encrypted and sent to a NIC that provides an external port. Each atomic operation can be created as a module.

In another approach with respect to the above example, a queue module can be inserted between the classifier and the connection multiplexer. If a decision is made to change how to do packet scheduling, batching can be conducted in a different order at the queue module and local traffic to the local container can be prioritized over the traffic going over the wire from the NIC. A simple change in how to use modules can provide flexibility creating better scheduling algorithms. Operating in a modular framework, as taught herein, can be used in network scheduler algorithms such as multi-resource fair queueing, weighted fair queueing (WFQ), deficit round robin (DRR), and start-time fair queuing (SFQ), and other algorithms.

It is noted that replicating network entities per protocol can limit efficiency. The approaches, taught herein, may appear to be counter to a standardized industry that looks to build in interoperability. However, typically the best efficiency can be achieved in a proprietary environment, because it provides more levers to adjust that result in a better performing implementation. It can still interoperate with rest of the systems as no external interfaces are changed but rather abstracted to use efficiently within the customized system. While it is desirable for a system, as taught herein arranged as an edge cloud or other equivalent environment, to interoperate with any cloud operating system, the system is not limited to parameters of such cloud operating systems. For instance, an edge cloud can be a contiguous set of servers that should be compatible with hardware connectivity, but the software platform running on it should perform at maximum efficiency. Maximum efficiency should translate to low latency and high throughput as being fundamental to an edge cloud platform. The architecture and method, as taught herein, suggest to not use standard protocol within the purview of an edge cloud. The architecture and method can be implemented in a manner in which there is no TCP/IP stack, RDMA stack as in IP over Infiniband (IPoIB) or any such standard stack for networking within the edge cloud. Infiniband is an architecture and specification for data flow between processors and input/output (I/O) devices. However, interfaces, as taught herein, may connect to any standard external interface such as IP, RDMA, RDMA over converged ethernet (RoCE), or IPoIB, but with the internal mechanism to program packet transfers customized for performance.

Packet transfers, as taught herein, can be performed as memory read/write operations in user space and not hit kernel overheads with multiple data transfers. The modular architecture with local identifiers, as taught herein, within a forwarding plane can use an internal scheme of identifying packets and tagging with internal IDs. This allows creation of a network path as a simple API call without passing packet data (no copying) but rather transition to next software module. The same reference pointer can be used that the previous module used. In this way, extra metadata area can be provisioned to save packet state information.

In various embodiments, a method for realizing network functions, packet forwarding, or network functions in conjunction with packet forwarding uses a modular framework to develop software modules for realizing the network functions and the packet forwarding. In this framework, to compose any service, a data graph structure connecting modules using graph edges can be used. The data graph structure may use a tree-like structure connecting modules using tree edges. Each significant path can represent a network path. Each network path can be locally assigned a globally unique identifier, which may be labeled a datapath_ID, and maintained in a control plane for a system network. Each end-point in the system network can be locally identified by a port_ID. A composition of a set of modules representing a service or a virtual network function can be assigned locally another a globally unique identifier that represents a device_ID, which can be maintained in the control plane.

For each physical host in a system network, there can be one or more NICs. Each NIC can be assigned a host_ID. The mapping of the host_ID to a physical host may remain in a management layer for the network in which the host_ID is not directly involved in data forwarding in the data plane of the system network. Using a host_ID, a device_ID, a datapath_ID, multicast_ID, and a port_ID, any type of network can be created. A distinct policy_ID can be used in packet metadata to map to policy defined in a management plane or in a control plane and managed in the control plane. Processing in a system network can be identified using four identifiers: a device_ID, a datapath_ID, a port_ID, and a policy_ID. The device_ID and the datapath_ID are maintained in the control plane and are associated with the composition of services to operate on a data packet, where the data packet is received from a NIC from exterior to the local system network or from a VNIC associated with local generation of a data packet, for example, from a local application.

Modules can be dynamically composed in the control plane based on user criteria for processing data packets that are being forwarded to an exterior network or terminating locally. One or more of the dynamically composed modules may be virtual network functions. Any number of virtual network functions and forwarding logic can be created with reusable components provided by a modular framework and internal representations for data packets and the system network. Some dynamically composed modules can perform one or more lookup operations and switch a data packet to its appropriate port that acts as an end-point destination in the system network. Some can determine if packets can flow from one datapath, which is a network path, to another, thereby creating a router-like function. Many other functions can be created using modules in a modular framework tied to internal generation of identifiers for each data packet in a forwarding plane.

As taught herein, an optimal network data plane using special purpose modules, flow graphs, and table lookups in the special purpose modules can be built. Modules in a modular framework tied to internal generation of identifiers for each data packet in a forwarding plane can also provide optimal programming paradigm for implementing packet schedulers. An optimal solution to issues associated with latency in data packet communication can be addressed in manner taught herein with respect to a modular framework and can be highly reusable with dynamic configuration at runtime.

Dynamically composable modules using a modular framework tied to internal generation of identifiers for each data packet in a forwarding plane provides for a low latency virtual network platform that is not currently available with conventional approaches. The modular framework tied to internal generation of identifiers for each data packet in a forwarding plane can be implemented to use as much hardware offloads as possible to enhance performance and reduce latency. This architecture can be built on top of many existing technologies and architectures and can evolve into a new computing paradigm that provides exact hooks for improving network performance at the edge of a network or at other locations with the network. A modular software framework, as taught herein, can provide best utilization of the hardware resources such as CPU resources and offload capable application specific integrated circuits (ASICs) and field programmable gate arrays (FPGAs). This framework helps create building blocks of components that can work better when there are features available from hardware components that can pick up one or more activities from CPU, providing hardware offload.

Figure 7:
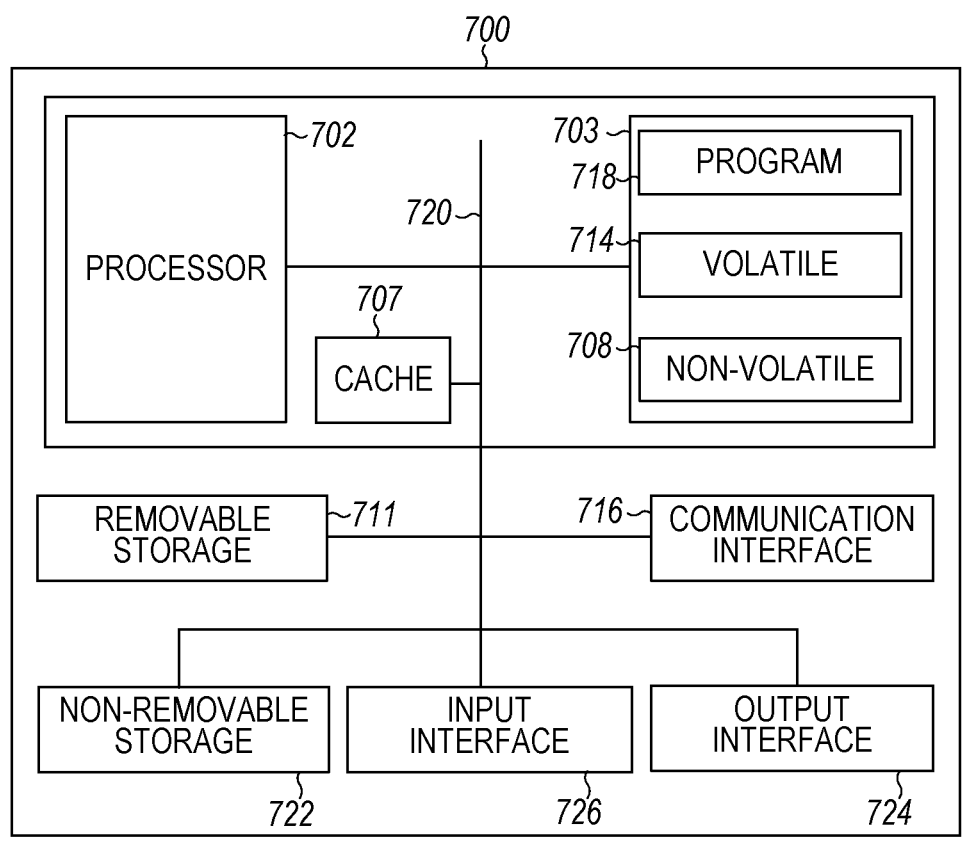
FIG. 7 is a block diagram of a device for processing data packets in a system using a modularized architecture based on internal identifiers for the data packets generated in the system, according to an example embodiment.

FIG. 7 is a block diagram of a device for processing data packets in a system using a modularized architecture based on internal identifiers for the data packets generated in the system, according to the teachings herein. FIG. 7 depicts a system 700 having a non-transitory memory storage 703 storing instructions, a cache 707, and a processing unit 702, coupled to a bus 720. Processing unit 702 can include one or more processors operatively in communication with non-transitory memory storage 703 and cache 707. The one or more processors can be structured to execute the instructions to operate system 700 according to any of the methods taught herein. The one or more processors can be structured to execute the instructions to: control processing of a set of data packets using identifiers assigned locally in the system for each data packet received at an entry point in the system; and process each data packet along a directed graph data structure based on the identifiers assigned locally, the directed graph data structure providing a network pipeline to forward the data packet.

System 700 can include a communication interface 716 operable to communicate with a network external to system 700. The communication interface 716 can have the capability to communicate with other nodes of a cluster to process data packets to forward the data packets to their destinations. The communication interface 716 may be part of a data bus that can be used to receive data packets for processing.

Non-transitory memory storage 703 may be realized as machine-readable media, such as computer-readable media, and may include volatile memory 714 and non-volatile memory 708. System 700 may include or have access to a computing environment that includes a variety of machine-readable media including as computer-readable media, such as volatile memory 714, non-volatile memory 708, removable storage 711, and non-removable storage 722. Such machine-readable media may be used with instructions in one or more programs 718 executed by system 700. Cache 707 may be realized as a separate memory component or part of one or more of volatile memory 714, non-volatile memory 708, removable storage 711, or non-removable storage 722. Memory storage can include random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

System 700 may include or have access to a computing environment that includes an input interface 726 and an output interface 724. Output interface 724 may include a display system, such as a touchscreen, that also may serve as an input device. The input interface 726 may include one or more of a touchscreen, touchpad, mouse, keyboard, camera, one or more device-specific buttons, one or more sensors integrated within or coupled via wired or wireless data connections to system 700, and other input devices.

System 700 may operate in a networked environment using a communication connection to connect to one or more other systems that are remote. Such remote systems may be similar to system 700 or may be different types of systems having features similar or identical to features of system 700 or other features, as taught herein, to handle data packet forwarding. A plurality of systems similar to system 700 can be used as nodes of a cluster to handle forwarding of data packets in a network. Remote systems may include computers, such as database servers. Such remote computers may include a personal computer (PC), server, router, network PC, a peer device or other common network node, or the like. The communication connection may include a Local Area Network (LAN), a Wide Area Network (WAN), cellular, WiFi, Bluetooth, or other networks.

Machine-readable instructions, such as computer-readable instructions stored on a computer-readable medium, are executable by the processing unit 702 of the system 700. A hard drive, CD-ROM, and RAM are some examples of articles including a non-transitory computer-readable medium such as a storage system. The terms machine-readable medium, computer-readable medium, storage system, and storage device do not include carrier waves to the extent carrier waves are deemed transitory. Storage can also include networked storage such as a storage area network (SAN).

System 700 can be realized as a computing system that may be in different forms in different embodiments, as part of a network such as a SDN/IoT network. In addition, some of these devices may be considered as systems for the functions and/or applications for which they are implemented. Further, although the various data storage elements are illustrated as part of the system 700, the storage may also or alternatively include cloud-based storage accessible via a network, such as the Internet or server based storage.

Although the present disclosure has been described with reference to specific features and embodiments thereof, it is evident that various modifications and combinations can be made thereto without departing from scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A system comprising:
   a memory storage comprising instructions; and
   one or more processors in communication with the memory storage, wherein the one or more processors execute the instructions to:
   control processing of a set of data packets using locally-assigned identifiers assigned locally in the system for each data packet received at an entry point in the system, the locally-assigned identifiers for the each data packet providing a representation of the each data packet internal to the system different from network identification of the each data packet, with the each data packet including a system identifier sent with the each data packet within the system, the locally-assigned identifiers including a device identifier for each virtual network function of one or more virtual network functions of the system and a datapath identifier corresponding to a network mapping to which the each data packet belongs; and
   process the each data packet along a directed graph data structure based on the locally-assigned identifiers, the directed graph data structure providing a network pipeline to forward the each data packet.

2. The system of claim 1, wherein the locally-assigned identifiers for the each data packet include a port identifier corresponding to a packet destination or a policy identifier associated with a service level agreement policy, the service level agreement policy defining a factor for selecting a path taken by the each data packet through the network pipeline.

3. The system of claim 2, wherein the one or more processors execute the instructions to process the each data packet at the one or more virtual network functions of the system based on the locally-assigned identifiers, the each virtual network function being deployed as a set of nodes in the directed graph data structure.

4. The system of claim 3, wherein the device identifier and the datapath identifier are managed in a control logic of the system and are used to direct the each data packet to the packet destination or through a service-chain defined by a chain of virtual network functions.

5. The system of claim 1, wherein the one or more processors execute the instructions to create the one or more virtual network functions, to configure the one or more virtual network functions dynamically at runtime, and to connect the created one or more virtual network functions into a data pipeline.

6. The system of claim 1, wherein the one or more virtual network functions includes one or more sub-functions.

7. The system of claim 1, wherein the one or more processors execute the instructions to perform operations as a classifier to:
   receive the set of data packets;
   classify individual data packets of the set of data packets;
   augment the individual data packets into an internal representation including a port identifier or a policy identifier; and
   save the port identifier or the policy identifier within a metadata area of the individual data packets.

8. The system of claim 7, wherein results of processing operations along the network pipeline are saved in the metadata area of the individual data packets.

9. The system of claim 1, wherein the locally-assigned identifiers for the each data packet include a multi-cast identifier.

10. A computer-implemented method for local processing of data packets, comprising:
    controlling, with one or more processors, processing of a set of data packets using locally- assigned identifiers assigned locally in the system for each data packet received at an entry point in the system, the locally-assigned identifiers for the each data packet providing a representation of the each data packet internal to the system different from network identification of the each data packet, with the each data packet including a system identifier sent with the each data packet within the system, the locally-assigned identifiers including a device identifier for each virtual network function of one or more virtual network functions of the system and a datapath identifier corresponding to a network mapping to which the each data packet belongs; and
    processing, with the one or more processors, the each data packet along a directed graph data structure based on the locally-assigned identifiers assigned locally, the directed graph data structure providing a network pipeline to forward the each data packet.

11. The computer-implemented method of claim 10, wherein the locally-assigned identifiers for the each data packet include a port identifier corresponding to a packet destination or a policy identifier associated with a service level agreement policy, the service level agreement policy defining a factor for selecting a path taken by the each data packet through the network pipeline.

12. The computer-implemented method of claim 11, wherein processing each data packet includes processing the each data packet at the one or more virtual network functions of the system based on the locally-assigned identifiers, the each virtual network function being deployed as a set of nodes in the directed graph data structure.

13. The computer-implemented method of claim 12, wherein the device identifier and the datapath identifier are managed in control logic of the system and are used to direct the each data packet to the packet destination or through a service-chain defined by a chain of virtual network functions.

14. The computer-implemented method of claim 10, wherein the method includes creating the one or more virtual network functions, configuring the one or more virtual network functions dynamically at runtime, and connecting the created one or more virtual network functions into a data pipeline.

15. The computer-implemented method of claim 10 wherein the one or more virtual network functions include one or more sub-functions.

16. The computer-implemented method of claim 10, wherein the method includes performing operations as a classifier, the operations including:
 receiving the set of data packets;
 classifying individual data packets of the set of data packets;
 augmenting the individual data packets into an internal representation including a port identifier and a policy identifier; and
 saving the port identifier and the policy identifier in a metadata area of the individual data packets.

17. The computer-implemented method of claim 16, wherein the method includes saving, in the metadata area of each data packet, results of processing each data packet as it traverses through the directed graph data structure.

18. The computer-implemented method of claim 10, wherein the method includes assigning a multi-cast identifier as one of the locally-assigned identifiers for the each data packet.

19. A non-transitory computer-readable media storing computer instructions, that when executed by one or more processors, cause the one or more processors to perform the steps of:
 controlling processing of a set of data packets using locally-assigned identifiers assigned locally in the system for each data packet received at an entry point in the system, the locally-assigned identifiers for the each data packet providing a representation of the data packet internal to the system different from network identification of the data packet, with the each data packet including a system identifier sent with the each data packet within the system, the locally-assigned identifiers including a device identifier for each virtual network function of one or more virtual network functions of the system and a datapath identifier corresponding to a network mapping to which the each data packet belongs; and
 processing the each data packet along a directed graph data structure based on the locally-assigned identifiers, the directed graph data structure providing a network pipeline to forward the each data packet.

20. The non-transitory computer-readable media of claim 19, wherein the operations include:
 performing operations as a classifier, the operations including:
 receiving the set of data packets;
 classifying individual data packets of the set of data packets;
 augmenting the individual data packets into an internal representation including a port identifier corresponding to a packet destination of the individual data packets or a policy identifier associated with a policy, in which the port identifier or the policy identify the path traversed by the individual data packets through the directed graph data structure;
 saving the port identifier or the policy identifier in a metadata area of the individual data packets;
 assigning the locally-assigned identifiers to include a device identifier for the each virtual network function and a datapath identifier for a unique path for the individual data packets to traverse through the network pipeline; and
 using the device identifier and the datapath identifier in control logic and using the port identifier or the policy identifier in the individual data packets to direct the individual data packets to the packet destination or to a service-chain defined by a chain of virtual network functions along a path of the individual data packets traversing through the network pipeline.

\* \* \* \* \*

UNITED STATES PATENT AND TRADEMARK OFFICE
CERTIFICATE OF CORRECTION

PATENT NO. : 10,986,041 B2  
APPLICATION NO. : 16/057087  
DATED : April 20, 2021  
INVENTOR(S) : Rangachari et al.

Page 1 of 1

It is certified that error appears in the above-identified patent and that said Letters Patent is hereby corrected as shown below:

In the Claims

In Column 26, Line 56, in Claim 10, delete "identifiers assigned locally," and insert --identifiers,-- therefor In Column 27, Line 17, in Claim 15, after "10", insert --,--

Signed and Sealed this  
Seventeenth Day of August, 2021

Drew Hirshfeld  
*Performing the Functions and Duties of the*  
*Under Secretary of Commerce for Intellectual Property and*  
*Director of the United States Patent and Trademark Office*